Patented Dec. 22, 1931

1,837,254

UNITED STATES PATENT OFFICE

WALTER A. DEW, OF CHARLESTON, WEST VIRGINIA, ASSIGNOR TO DU PONT AMMONIA CORPORATION, OF WILMINGTON, DELAWARE, A CORPORATION OF DELAWARE

PROCESS OF PRODUCING HYDROGEN

No Drawing.   Application filed November 12, 1926.   Serial No. 148,106.

This invention relates to catalytic gas-phase reactions, and particularly to a process of producing hydrogen from steam and carbon monoxide-containing gases.

One of the principal difficulties heretofore encountered in processes involving carbon monoxide or hydrogen arises from the fact that the least expensive sources of carbon monoxide or hydrogen, such as water-gas, producer gas, etc., invariably contain sulfur in the form of hydrogen sulphide, carbon bisulphide, thiophenes, mercaptans, thio-ethers, etc. Moreover, the more desirable a given gas is from the standpoint of cheapness, the higher its sulphur content is likely to be. Thus, in the case of water-gas the principal item of cost is the cost of the fuel from which it is made, and in general the cheaper the fuel the higher its sulfur content.

It is known that catalysts of the iron oxide type rapidly suffer loss of activity in the presence of small quantities of sulfur. The original activity of catalysts of the iron oxide type can be restored in part by reactivation, but the usual metallic catalysts, such as cobalt, undergo cumulative and permanent poisoning.

In order to maintain the activity of the catalyst in gas-phase reactions, it has been necessary, therefore, to submit the gases going to the reaction apparatus to a sulfur-removal operation. Hydrogen sulphide can be removed by rather simple but, nevertheless, somewhat costly methods. No practical means has been devised, however, for satisfactorily eliminating the organic sulfur compounds. Moreover, the fact that most of the processes for hydrogen-sulphide removal are best carried out at low temperature has made it impossible in the past to employ such processes, and at the same time to utilize, in the main process itself as may be desirable, the heat available in the hot gases leaving the furnace, producer, or other apparatus in which they are generated. These considerations point to the very great desirability of being able to conduct catalytic processes involving hydrogen or carbon monoxide without the necessity for preliminary removal of sulfur compounds present therein.

It is the object of the present invention to avoid the effect of sulfur in catalytic gas-phase reactions, and especially to provide an improved process of conducting such reactions, especially for the production of hydrogen by the catalytic reaction of steam and carbon monoxide-containing gases. The process has a further advantage in that the carbon monoxide-steam conversion changes the organic sulfur compounds, which are removable only with great difficulty, into hydrogen sulphide. This latter, of course, can be easily removed from the hydrogen (along with the hydrogen sulfide originally present and in the same operation as the carbon dioxide produced by the reaction of steam and carbon monoxide) in the event that it is necessary to produce hydrogen free from sulfur, as is the case if it is to be used in the synthesis of ammonia or the hydrogenation of oils.

Other objects and advantages will be apparent as the invention is better understood by reference to the following specification, in which its preferred embodiments are described.

I have discovered that uranium oxide is a catalyst for the carbon monoxide-steam conversion and that in this as well as other reactions involving carbon monoxide or hydrogen in which it functions catalytically, it is insensitive to the poisoning influence of sulfur; that is to say, uranium oxide can be used to catalyze the reaction in the presence of sulfur compounds for long periods without substantial deterioration. Thus, in the production of hydrogen by reaction of steam and carbon monoxide the presence in the gases of as much as 5% hydrogen sulfide does not affect the the activity of the chromium oxide.

The use of uranium oxide as a catalyst in reactions involving carbon monoxide is especially advantageous in view of the fact that it causes little or no deposition of carbon under conditions where catalysts such as iron, nickel and cobalt become rapidly coated with carbon produced by decomposition of carbon monoxide.

The uranium oxide may be prepared in any convenient way, for example, by precipitation from its salts, by ignition of the nitrate, or by oxidation or calcination of suitable compounds. It may be prepared with or without the use of supporting materials, such as pumice or the like.

I have found that the activity of uranium oxide as a carbon monoxide-steam conversion catalyst may be improved by the addition of suitable substances hereinafter referred to as promoters, and that this can be done without substantial decrease in the sulfur-insensitiveness of the catalyst. Among the substances adapted for this purpose are chromium oxide, zirconium oxide, vanadium oxide, aluminum oxide, silicon oxide, and boron oxide. The promoted catalysts may be prepared by any suitable method, for example, by mixing or coprecipitating the oxides, ignition of mixtures of nitrates, or by preparing a chemical compound of uranium oxide and the promoting ingredient. Also, a catalyst containing two or more promoter ingredients may be employed. I have found that chromium oxide is especially valuable as a promoter, a uranium oxide-chromium oxide catalyst, such as uranyl chromate, being active for the conversion of steam and carbon monoxide to hydrogen and substantially unaffected by such quantities of sulfur compounds as are ordinarily present in commercial water-gas.

The following examples will serve to indicate the preferred procedure in carrying out the invention as it relates to the catalytic production of hydrogen from steam and carbon monoxide, although it will be understood that the invention is not limited to the details of the operation herein described.

*Example 1.*—Dissolve 100 grams of uranyl nitrate in 500 cc. of distilled water. Add ammonium hydroxide until precipitation is complete. Thoroughly wash the precipitate by decantation with distilled water, filter and dry at 130° C. Break up the dried product and screen to a suitable size. Place the material in a silica tube disposed in an electric furnace. Heat the catalyst to a temperature of about 500° C., and while maintaining that temperature pass over it a mixture of four volumes of steam and one volume of commercial water gas containing, for example, 48% hydrogen, 44% carbon monoxide, and 1% sulfur compounds, calculated as hydrogen sulphide. In my experiments I have found that under these conditions I was able to attain a conversion yielding over 60% hydrogen (on a dry basis) in the exit gases with a space velocity of 50. (The space velocity is the hourly volume of gas flowing through the apparatus per unit volume of catalyst, under standard conditions of temperature and pressure). The activity of the catalyst was not appreciably affected by the presence of sulfur.

The uranium oxide may be prepared by other methods than that described, for example, by ignition of the nitrate or by deposition upon a support, e. g., pumice.

*Example 2.*—Add a solution of 50 grams of uranyl nitrate in 290 cc. of distilled water to a solution of 50 grams of potassium chromate in 500 cc. of water, while stirring constantly. Wash the precipitate by decantation with distilled water, filter and dry at 130° C. Break up the dried material and screen to the desired particle size.

The steam-conversion reaction may be effected under pressure above atmospheric pressure, with an advantageous decrease in size of the apparatus required and in heat losses by radiation. Also, oxygen may be injected with the steam-carbon monoxide mixture to furnish by combustion a part of the heat necessary for maintaining the reaction temperature, if the heat evolved by the reaction is insufficient to compensate for the losses by radiation, etc.

No explanation or theory is offered as to what changes may occur in the physical form or chemical composition of the catalyst in the course of its preparation or during its actual use. The term "catalyst" as employed in the claims is intended, therefore, to include the contact mass as prepared as well as any modified form in which it may exist during the reaction.

The process as hereinbefore described provides a satisfactory and economical method of carrying out processes involving hydrogen or carbon monoxide, and particularly the catalytic manufacture of hydrogen, without preliminary removal of sulfur compounds from the gaseous raw materials. Various changes may be made in the operation as described without departing from the invention or sacrificing any of the advantages thereof.

I claim:—

1. The process of manufacturing hydrogen, which consists in subjecting a mixture of steam and carbon monoxide to the action of a catalyst consisting of uranium oxide and chromium oxide in chemical combination.

2. The process of manufacturing hydrogen, which consists in subjecting a sulfur-containing mixture of steam and carbon monoxide to the action of a catalyst consisting of uranium oxide and chromium oxide in chemical combination.

In testimony whereof I affix my signature.

WALTER A. DEW.